US010813025B2

(12) United States Patent
Lu et al.

(10) Patent No.: US 10,813,025 B2
(45) Date of Patent: Oct. 20, 2020

(54) ELECTRONIC DEVICE AND METHOD USED FOR WIRELESS COMMUNICATION

(71) Applicant: Sony Corporation, Tokyo (JP)

(72) Inventors: Penshun Lu, Beijing (CN); Chen Sun, Beijing (CN); Xin Guo, Beijing (CN); Jianfei Cao, Beijing (CN); Tao Cui, Beijing (CN)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/612,410

(22) PCT Filed: Jun. 14, 2018

(86) PCT No.: PCT/CN2018/091262
§ 371 (c)(1),
(2) Date: Nov. 11, 2019

(87) PCT Pub. No.: WO2018/233545
PCT Pub. Date: Dec. 27, 2018

(65) Prior Publication Data
US 2020/0137650 A1 Apr. 30, 2020

(30) Foreign Application Priority Data
Jun. 21, 2017 (CN) .......................... 2017 1 0475863

(51) Int. Cl.
*H04W 36/08* (2009.01)
*H04W 36/00* (2009.01)
*H04W 36/38* (2009.01)

(52) U.S. Cl.
CPC ....... *H04W 36/08* (2013.01); *H04W 36/0061* (2013.01); *H04W 36/0072* (2013.01); *H04W 36/38* (2013.01)

(58) Field of Classification Search
CPC ..................................................... H04W 36/08
(Continued)

(56) References Cited

U.S. PATENT DOCUMENTS

| 2009/0156210 | A1 | 6/2009 | Ponce et al. | |
| 2014/0141795 | A1* | 5/2014 | Abraham | G01S 5/00 455/456.1 |
| 2016/0323786 | A1* | 11/2016 | Syed | H04W 36/0038 |

FOREIGN PATENT DOCUMENTS

| CN | 101960890 A | 1/2011 |
| CN | 106131940 A | 11/2016 |
| CN | 106162781 A | 11/2016 |

OTHER PUBLICATIONS

International Search Report and Written Opinion dated Sep. 12, 2018 for PCT/CN2018/091262 filed on Jun. 14, 2018, 8 pages including English Translation of the International Search Report.

* cited by examiner

*Primary Examiner* — Joel Ajayi
(74) *Attorney, Agent, or Firm* — Xsensus LLP

(57) ABSTRACT

Provided are an electronic device and method used for wireless communication. The electronic device comprises: a processing circuit, configured to: acquire a first candidate list of a first mobile base station, wherein the first candidate list comprises at least some neighbour nodes of the first mobile base station; determine a neighbour node as a second mobile base station from the first candidate list, wherein the second mobile base station is capable of replacing the first mobile base station as a successor base station of the first mobile base station for continuing to provide a service for a current user; and acquiring a second candidate list of the second mobile base station, wherein the second candidate list comprises at least some neighbour nodes of the second mobile base station.

19 Claims, 7 Drawing Sheets

(58) Field of Classification Search
 USPC .......................................................... 455/436
 See application file for complete search history.

ELECTRONIC DEVICE AND METHOD USED FOR WIRELESS COMMUNICATION

CROSS-REFERENCE TO RELATED APPLICATIONS

The present application is based on PCT filing PCT/CN2018/091262, filed on Jun. 14, 2018, which claims the priority to Chinese Patent Application No. 201710475863.8, titled "ELECTRONIC DEVICE AND METHOD USED FOR WIRELESS COMMUNICATION", filed on Jun. 21, 2017 with the China National Intellectual Property Administration, the entire contents of each are incorporated herein by reference.

FIELD

Embodiments of the present disclosure generally relate to the field of wireless communications, in particular to handover of a mobile base station, and in more particular to an electronic apparatus and a method for wireless communications.

BACKGROUND

With the advancement of the urbanization process, it becomes increasingly difficult to deploy more macro base stations and small base stations in a city with a small area and a large population. Therefore, one of tendencies for the future mobile communications is to deploy a mobile base station. Compared with a fixed base station, the mobile base station has strong mobility and can provide internet access service based on a specific requirement or hot spots in a certain region, thereby being capable of meeting the communication requirements flexibly and effectively.

However, the mobile base station providing service may have to leave due to some reasons. For example, in a case that an emergency event occurs, the mobile base station closest to the accident site has to reach and provide support. In this case, a user group which is originally served by the mobile base station will suffer service interruption, and thus the user group is required to be handed over to another mobile base station to avoid service interruption.

Therefore, how to quickly hand the users over to an appropriate mobile base station becomes important for improving the communication quality and efficiency.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided, which includes processing circuitry. The processing circuitry is configured to: acquire a first candidate list for a first mobile base station, the first candidate list including at least a part of neighbor nodes of the first mobile base station; determine a neighbor node from among the first candidate list as a second mobile base station, which is capable of serving as a successive base station of the first mobile base station, to replace the first mobile base station to continue providing service for current users; and acquire a second candidate list for the second mobile base station, the second candidate list including at least a part of neighbor nodes of the second mobile base station.

According to another aspect of the present disclosure, a method for wireless communications is provided. The method includes: acquiring a first candidate list for a first mobile base station, the first candidate list including at least a part of neighbor nodes of the first mobile base station; determining a neighbor node from among the first candidate list as a second mobile base station, which is capable of serving as a successive base station of the first mobile base station, to replace the first mobile base station to continue providing service for current users; and acquiring a second candidate list for the second mobile base station, the second candidate list including at least a part of neighbor nodes of the second mobile base station.

According to other aspects of the present disclosure, computer program codes and computer program products for implementing the above methods, and computer readable storage medium on which computer program codes for implementing the above methods are recorded are further provided.

With the electronic apparatus and the method according to the present disclosure, two candidate lists are stored, thereby reducing a time delay of handover of the mobile base station and improving a probability of successful handover.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure.

In the accompanying drawings.

DETAILED DESCRIPTION OF THE EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

As described above, a mobile base station may need to leave a current region or cannot continue providing service for its current users due to other reasons. In this case, in order to ensure the communication quality of the users, it is required to perform handover of the mobile base station. The current region indicates a region which the mobile base station currently serves. For example, a macro base station or a fixed base station in a corresponding region may perform handover of the mobile base station. It should be understood that determining timing for performing handover and selecting of a handover target are important to a time delay of the handover and a success rate of the handover.

Figure 1:
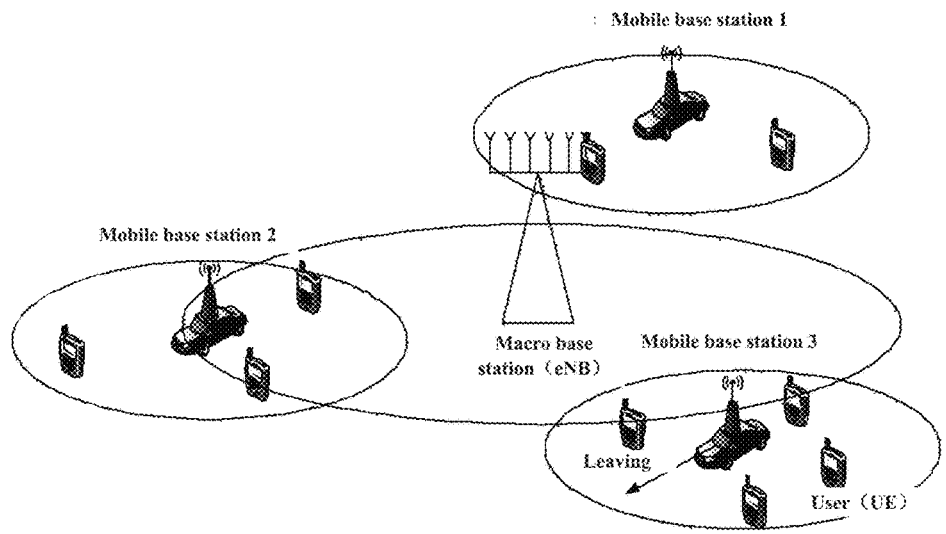
FIG. 1 is a schematic diagram of a scenario of handover of a mobile base station.

FIG. 1 is a schematic diagram of a scenario of handover of a mobile base station. In an example, user equipment (UE) of a mobile base station 3 which is to leave performs measurement on mobile base stations nearby such as a mobile base station 1 and a mobile base station 2, and reports measurement results to a macro base station or a fixed base station (eNB). The eNB performs scheduling based on the measurement results, for example, hands the UE over to the mobile base station 1. However, in some scenarios, the UE may be beyond the coverage range of the eNB, and the above scheduling cannot be achieved. In this case, the mobile base station may report information on neighbor nodes (such as mobile base stations around) before leaving, so that the eNB performs scheduling based on the information. In order to further reduce the time delay of handover and improve a success rate of the handover, the present disclosure provides a technology which can achieve quick and efficient handover of the mobile base station. Detailed description is made with reference to FIG. 2 to FIG. 5 hereinafter.

Figure 2:
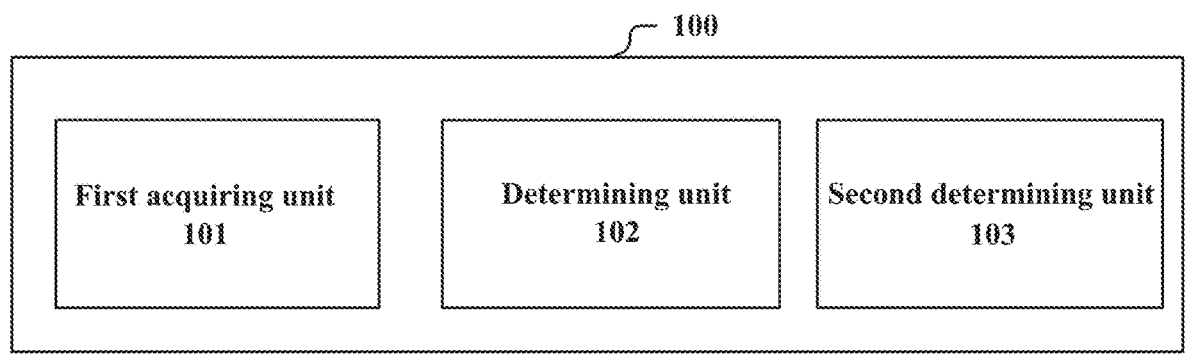
FIG. 2 is a block diagram of functional modules of an electronic apparatus for wireless communications according to an embodiment of the present disclosure.

FIG. 2 is a block diagram of functional modules of an electronic apparatus 100 for wireless communications according to an embodiment of the present disclosure. As shown in FIG. 2, the electronic apparatus 100 includes a first acquiring unit 101, a determining unit 102 and a second acquiring unit 103. The first acquiring unit 101 is configured to acquire a first candidate list for a first mobile base station. The first candidate list includes at least a part of neighbor nodes of the first mobile base station. The determining unit 102 is configured to determine a neighbor node from among the first candidate list as a second mobile base station. The second mobile base station can serve as a successive base station of the first mobile base station, to replace the first mobile base station to continue providing service for current users. The second acquiring unit 103 is configured to acquire a second candidate list for the second mobile base station. The second candidate list includes at least a part of neighbor nodes of the second mobile base station.

The first acquiring unit 101, the determining unit 102 and the second acquiring unit 103 may be implemented by one or more processing circuitry. The processing circuitry may be implemented as a chip, for example. The electronic apparatus 100 may be, for example, located in or communicatively connected to the macro base station or the fixed base station shown in FIG. 1, or may be appropriately arranged at a suitable position in a wireless communications network. The neighbor nodes described herein may for example include other mobile base stations. In addition, terms "first", "second" and so on herein are only used to distinguish components or elements, rather than indicating any meaning of an order.

For example, the first acquiring unit 101 acquires the first candidate list from the first mobile base station. The first mobile base station may create the first candidate list by broadcasting and provide the first candidate list to the first acquiring unit 101. Specifically, the first mobile base station performs broadcasting and receives broadcast responses from the neighbor nodes, thereby creating a list of the neighbor nodes, that is, the first candidate list. The first candidate list may include all or a part of neighbor nodes which make responses. Since the neighbor nodes in the list are located near the first mobile base station, the neighbor nodes may replace the first mobile base station to provide service for its users.

The determining unit 102 then determines a second mobile base station from among the first candidate list as a successive base station of the first mobile base station. In a case that the first mobile base station cannot continue providing service for current users due to certain reasons, the users may be handed over to the second mobile base station. The successive base station is determined in advance, so the time delay of the handover is short, and the first mobile base station can stop service at once, thereby improving flexibility. In addition, in a case that an accident occurs, for example, in a case that the first mobile base station is powered off, quick and reliable handover can also be realized.

In an example, the determining unit 102 may determine the neighbor node serving as the second mobile base station based on or more of the following factors: quantity of electricity of the neighbor node, capability of the neighbor node, current service status of the neighbor node, and movement trace of the neighbor node.

In other words, the determining unit 102 may determine a neighbor node, which has sufficient quantity of electricity, strong capability, is relatively idle currently or moves little, as the second mobile base station, thereby increasing a probability that the user can be handed over to the second mobile base station in a case of requiring handover.

Subsequently, the second acquiring unit 103 acquires a second candidate list for the second mobile base station. Similarly, the second acquiring unit 103 may acquire the list from the second mobile base station. The second mobile base station performs broadcasting and receives broadcast responses from the neighbor nodes, thereby creating a list of the neighbor nodes, that is, the second candidate list. The second candidate list may include all or a part of the neighbor nodes that make responses. Since the neighbor nodes in the list are located near the second mobile base station, the neighbor nodes may be located near the first mobile base station. Therefore, the neighbor nodes in the second candidate list may also serve as the successive base station.

The determining unit 102 may determine a scheduling manner of the mobile base station based on the first candidate list and/or the second candidate list. The determining of the scheduling manner described here may, for example, include: determining whether to perform handover of the mobile base station, determining a handover target, and determining whether to schedule the mobile base station to the current region. The manners will be described in detail hereinafter.

Figure 3:
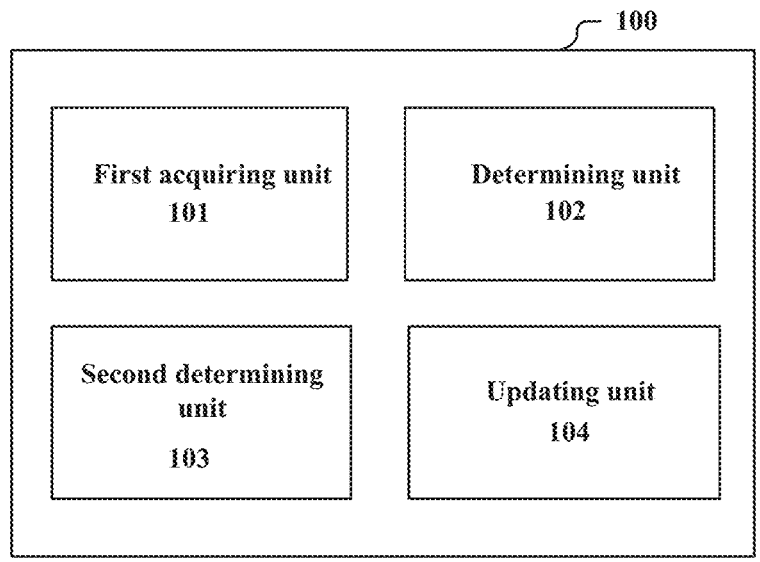
FIG. 3 is another block diagram of functional modules of an electronic apparatus for wireless communications according to an embodiment of the present disclosure.

As shown in FIG. 3, the electronic apparatus 100 may further include an updating unit 104, configured to update the first candidate list and the second candidate list every a predetermined time interval. Due to movement characteristics of the mobile base station, positions of the neighbor nodes may change with time, and thus the first candidate list and the second candidate list may also change with time. The predetermined time interval may be adjusted based on a frequency of emergency occurrence. In a case that the emergency situations frequently occur, the predetermined time interval may be set to be small. However, the manner for setting the predetermined time interval is not limited thereto. For example, the predetermined time interval may be set based on empirical values, a movement speed of the mobile base station, requirements on the time delay of handover and so on. In addition, an updating interval of the first candidate list may be set to be the same as or different from an updating interval of the second candidate list.

In an embodiment, the determining unit 102 is further configured to determine a scheduling manner by comparing the first candidate list before updating with the first candidate list after updating and by comparing the second candidate list before updating with the second candidate list after updating.

It should be understood that, when the mobile base station moves, a set of its neighbor nodes may change; and after the mobile base station moves for a long distance, the set of the neighbor nodes may completely change. Therefore, it can be determined whether the mobile base station moves or is to move to leave the current region by comparing the candidate list of the neighbor nodes before updating with the candidate list of the neighbor nodes after updating. Thus, the electronic apparatus 100 may determine the scheduling manner based on the above determining process, for example, determine whether to perform handover of the mobile base station and whether to perform handover to the second mobile base station and so on.

For example, the determining unit 102 is configured to determine that the first mobile base station can continue providing service for the current users when the first candidate list before updating is at least partially the same as the first candidate list after updating, that is, the first mobile base station does not leave the current region, and determine that the second mobile base station can replace the first mobile base station to provide service for the current users when the second candidate list before updating is at least partially the same as the second candidate list after updating, that is, the second mobile base station does not leave the current region. For example, it can be determined based on whether an intersection of the first candidate list before updating and the first candidate list after updating is a null set. In a case that the intersection is not a null set, it is indicated that the first candidate list before updating is at least partially the same as the first candidate list after updating; otherwise, it is indicated that the first candidate list before updating is completely different from the first candidate list after updating. Similarly, it can be determined based on whether an intersection of the second candidate list before updating and the second candidate list after updating is a null set. In a case that the intersection is not a null set, it is indicated that the second candidate list before updating is at least partially the same as the second candidate list after updating; otherwise, it is indicated that the second candidate list before updating is completely different from the second candidate list after updating.

In this case, the determining unit 102 determines that the first mobile base station can continue providing service and the second mobile base station can still serve as the successive base station, and no extra operation is required, thereby reducing the signaling overhead and processing load. Alternatively, the determining unit 102 may re-determine the second mobile base station based on the updated first candidate list. If the determined second mobile base station differs from the previous second mobile base station, a new second candidate list is acquired from the new second mobile base station. Subsequently, the updating unit 104 updates the second candidate list for the new second mobile base station. In another aspect, if the determined second mobile base station is the previous second mobile base station, the updating unit 104 updates the second candidate list based on the previous timing.

In addition, the determining unit 102 is configured to determine that the first mobile base station can continue providing service for the current users when the first candidate list before updating is at least partially the same as the first candidate list after updating, and determine that the second mobile base station cannot replace the first mobile base station to provide service for the current users due to movement when the second candidate list before updating is completely different form the second candidate list after updating. That is, the second mobile base station cannot serve as the successive base station of the first mobile base station.

In this case, the determining unit 102 determines a new second mobile base station from among the current first candidate list, which is different from the previous second mobile base station, and acquires a second candidate list for the new second mobile base station. Subsequently, the updating unit 104 updates the second candidate list for the new second mobile base station.

In addition, the determining unit 102 is configured to determine that the first mobile base station cannot continue providing service for the current users due to movement when the first candidate list before updating is completely different from the first candidate list after updating, and determine that the second mobile base station can replace the first mobile base station to provide service for the current users when the second candidate list before updating is at least partially the same as the second candidate list after updating. That is, the second mobile base station can serve as the successive base station.

In this case, the determining unit 102 determines the second mobile base station as the successive base station. The users of the first mobile base station are handed over to the second mobile base station to continue performing communication. Subsequently, the second mobile base station provides a candidate list of its neighbor nodes to the electronic apparatus 100, as the first candidate list. The determining unit 102 determines a new second mobile base station to serve as the successive base station based on the first candidate list, and the second acquiring unit 103 acquires a new second candidate list for the new second mobile base station. In other words, the second mobile base station replaces the first mobile base station to serve as a mobile base station currently providing service, and selects an appropriate neighbor node from among the first candidate list of its neighbor nodes as the successive base station and acquires a candidate list of neighbor nodes of the successive base station as a new second candidate list.

Finally, the determining unit 102 is configured to determine that the first mobile base station cannot continue providing service for the current users due to movement when the first candidate list before updating is completely different from the first candidate list after updating, and determines that the second mobile base station cannot replace the first mobile base station to provide service for the current users due to movement when the second candidate list before updating is completely different from the second candidate list after updating.

In this case, it is considered that both the first mobile base station and the second mobile base station move to leave the current region. The determining unit 102 may determine a neighbor node different from the second mobile base station from among the first candidate list before updating as the successive base station, or determine a neighbor node from among the second candidate list before updating as the successive base station. The users of the first mobile base station are handed over to the determined successive base station to continue performing communication. Alternatively, the mobile base stations may be scheduled to a region where the first mobile base station is previously located, and the successive base station is determined from among the scheduled mobile base stations.

In the above example, in one aspect, the first candidate list and the second candidate list are used to provide candidates for handover target for the mobile base station; and in another aspect, the first candidate list and the second candidate list can further be used to determine whether to perform handover of the mobile base station and whether the previously determined handover target is still available, thereby improving the success rate of handover. In this way, quick and efficient handover of the mobile base station can be realized.

In another example, an indication that the first mobile base station cannot continue providing service for the current users may be sent to the macro base station or the fixed base station, in a case that the first mobile base station needs to move to another region for example due to emergency events and cannot continue providing service for the current users. The determining unit 102 may be configured to determine, in response to the indication, the successive base station replacing the first mobile base station based on the first candidate list and/or the second candidate list.

In the example, the updating unit 104 may update the second candidate list in a predetermined time interval. The updating unit 104 may update or may not update the first candidate list.

For example, the determining unit 102 is configured to determine the second mobile base station as the successive base station, in a case that the second mobile base station can replace the first mobile base station to provide service for the current users. The determining unit 102 may determine that the second mobile base station can replace the first mobile base station to provide service for the current users at least based on that the second candidate list is at least partially the same as the second candidate list before updating. As described above, the candidate lists being partially same indicates that the second mobile base station does not move to leave the current region. Therefore, the second mobile base station can serve as the successive base station from a viewpoint of the space.

In another aspect, in a case that the second mobile base station cannot replace the first mobile base station to provide service for the current users, the determining unit 102 determines a neighbor node different from the second mobile base station from among the first candidate list as the successive base station, or determines a neighbor node from among the second candidate list before updating as the successive base station. If the updating unit 104 also updates the first candidate list, the determining unit 102 determines a neighbor node different from the second mobile base station from among the first candidate list before updating as the successive base station. Alternatively, the mobile base stations may be scheduled to a region where the first mobile base station is previously located, and the successive base station is determined from among the scheduled mobile base stations.

In the above example, in one aspect, the first candidate list and the second candidate list are used to provide candidates for handover target for the mobile base station; and in another aspect, the first candidate list and the second candidate list can be used to determine whether the previously determined handover target is still available, thereby improving the success rate of handover. In this way, quick and efficient handover of the mobile base station can be realized.

In addition, in other examples, the first candidate list and the second candidate list each may further include geographical location information of respective neighbor nodes. The determining unit 102 is configured to determine the successive base station at least based on the geographical location information. For example, the determining unit 102 determines the successive base station with reference to a relationship between the geographical location of the neighbor node and the current region.

Although not shown in FIG. 2 and FIG. 3, it should be understood that the electronic apparatus 100 may further include a transceiving unit, configured to perform signaling interaction with the first mobile base station and the second mobile base station. For example, the transceiving unit may receive the first candidate list from the first mobile base station, transmit an instruction to the second mobile base station to instruct the second mobile base station to provide the candidate list, and receive the second candidate list from the second mobile base station.

In addition, the transceiving unit may receive, from the first mobile base station, an indication that the first mobile base station cannot continue providing service for the current users.

Figure 4:
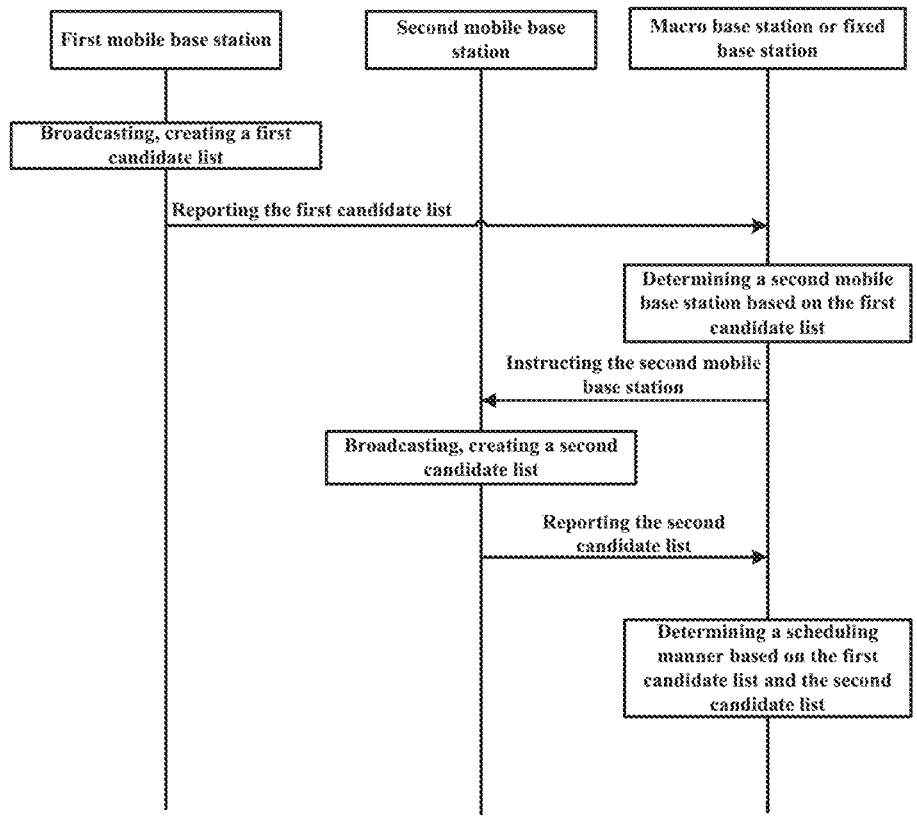
FIG. 4 is a schematic diagram of information procedure among a first mobile base station, a second mobile base station, and a macro base station or a fixed base station.

In order to facilitate understanding, FIG. 4 shows a schematic diagram of information procedure among the first mobile base station, the second mobile base station and a macro base station or a fixed base station. The first mobile base station creates a first candidate list by broadcasting and reports the first candidate list to the macro base station or the fixed base station. The macro base station or the fixed base station determines a second mobile base station serving as the successive base station based on the first candidate list, and instructs the second mobile base station to report the second candidate list. The second mobile base station performs, in response to the instruction, broadcasting to create a second candidate list, and reports the second candidate list to the macro base station or the fixed base station. The macro base station or the fixed base station determines a scheduling manner based on the first candidate list and the second candidate list, for example, determining whether to perform handover of the mobile base station, determining a handover target, and so on. The details are described above and are not repeated here.

Figure 5:
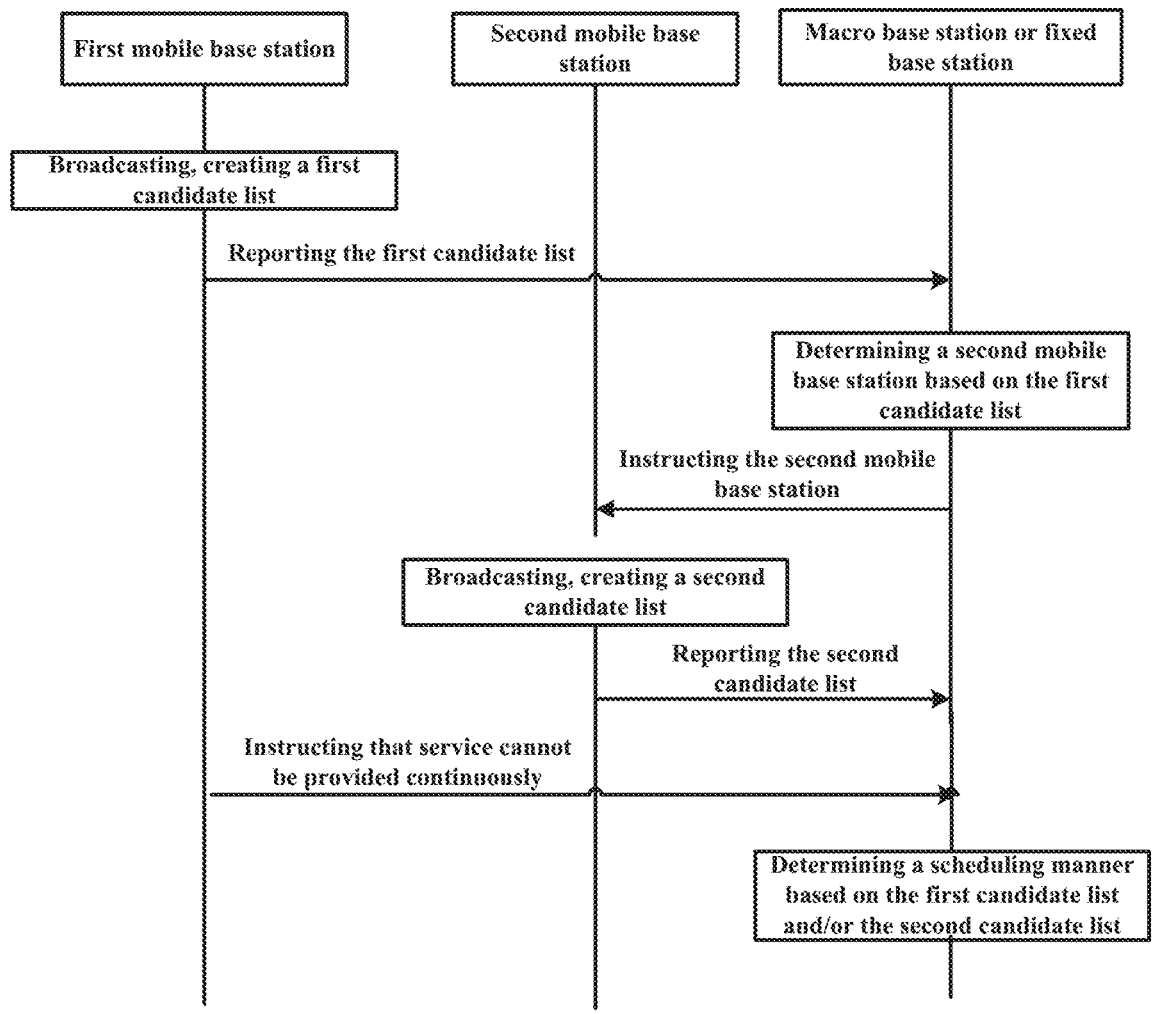
FIG. 5 is another schematic diagram of information procedure among a first mobile base station, a second mobile base station, and a macro base station or a fixed base station.

FIG. 5 is a schematic diagram of another information procedure among the first mobile base station, the second mobile base station and the macro base station or the fixed base station. The creation of the first candidate list and the second candidate list is the same as that described in FIG. 4, which is not repeated here. FIG. 5 differs from FIG. 4 in that: a corresponding indication is transmitted to the macro base station or the fixed base station, in a case that the first mobile base station cannot continue providing service. The macro base station or the fixed base station determines, in response to the indication, a scheduling manner based on the first candidate list and/or the second candidate list, for example, determining a handover target, and the like. Details are described above and are not repeated here.

In summary, the electronic apparatus 100 according to the embodiment of the present disclosure maintains the first candidate list and the second candidate list, thereby reducing the time delay of the handover of the mobile base station and improving the probability of the successful handover.

Second Embodiment

In the process of describing the electronic apparatus for wireless communications in the embodiments described above, obviously, some processing and methods are also disclosed. Hereinafter, an overview of the methods is given without repeating some details disclosed above. However, it should be noted that, although the methods are disclosed in a process of describing the electronic apparatus for wireless communications, the methods do not certainly employ or are not certainly executed by the aforementioned components. For example, the embodiments of the electronic apparatus for wireless communications may be partially or completely implemented with hardware and/or firmware, the method described below may be executed by a computer-executable program completely, although the hardware and/or firmware of the electronic apparatus for wireless communications can also be used in the methods.

Figure 6:
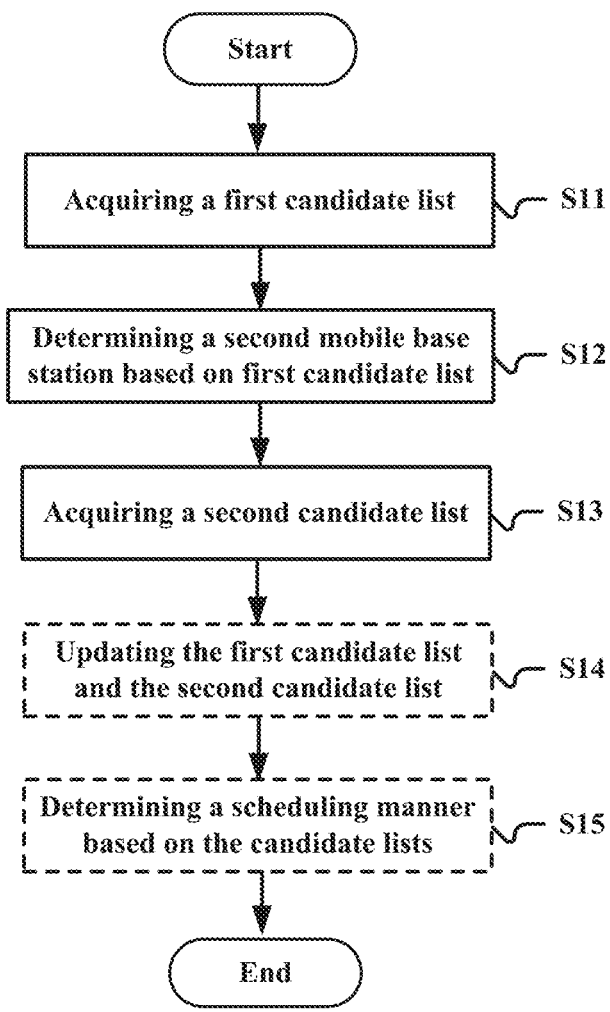
FIG. 6 is a flowchart of a method for wireless communications according to an embodiment of the present disclosure.

FIG. 6 is a flowchart of a method for wireless communications according to an embodiment of the present disclosure. As shown in FIG. 6, the method includes: acquiring a first candidate list for a first mobile base station, where the first candidate list includes at least a part of neighbor nodes of the first mobile base station (S11); determining a neighbor node from among the first candidate list as a second mobile base station, which can serve as a successive base station of the first mobile base station to replace the first mobile base station to continue providing service for current users (S12); and acquiring a second candidate list for the second mobile base station, where the second candidate list includes at least a part of neighbor nodes of the second mobile base station (S13).

The first candidate list and the second candidate list may be created and provided by the first mobile base station and the second mobile base station in a broadcasting manner respectively.

In step S12, the neighbor node serving as the second mobile base station may be determined based on one or more of the following factors: quantity of electricity of the neighbor node, capability of the neighbor node, current service status of the neighbor node, and movement trace of the neighbor node.

As shown by a dashed line block in FIG. 6, the method may further include a step S14: updating the first candidate list and the second candidate list every a predetermined time interval. For example, the predetermined time interval may be adjusted based on a frequency of emergency occurrence.

In addition, as shown by another dashed line block in FIG. 6, the method may further include a step S15: determining a scheduling manner of the mobile base station based on the first candidate list and/or the second candidate list.

In an example, in step S15, the scheduling manner is determined by comparing the first candidate list before updating with the first candidate list after updating and comparing the second candidate list before updating with the second candidate list after updating.

In a case that the first candidate list before updating is at least partially the same as the first candidate list after updating, it is determined that the first mobile base station can continue providing service for current users; and in a case that the second candidate list before updating is at least partially the same as the second candidate list after updating, it is determined that the second mobile base station can replace the first mobile base station to provide service for the current users. In this case, no extra operation is performed. Or, the second mobile base station may be re-determined based on the updated first candidate list, and the second candidate list for the newly determined second mobile station is acquired and updated in a case that the newly determined second mobile base station differs from the previous second mobile base station.

In a case that the first candidate list before updating is at least partially the same as the first candidate list after updating, it is determined that the first mobile base station can continue providing service for the current users; and in a case that the second candidate list before updating is completely different from the second candidate list after updating, it is determined that the second mobile base station cannot replace the first mobile base station to provide service for the current users due to movement. In this case, the second mobile base station may be updated. That is, a new second mobile base station is determined from among a current first candidate list, and a second candidate list for the new second mobile base station is acquired.

In a case that the first candidate list before updating is completely different from the first candidate list after updating, it is determined that the first mobile base station cannot continue providing service for the current users due to movement; and in a case that the second candidate list before updating is at least partially the same as the second candidate list after updating, it is determined that the second mobile base station can replace the first mobile base station to provide service for the current users. In addition, the second mobile base station may be determined as the successive base station, and thus the users are handed over to the successive base station. Accordingly, the first candidate list and the second candidate list are acquired and updated again.

In a case that the first candidate list before updating is completely different from the first candidate list after updating, it is determined that the first mobile base station cannot continue providing service for the current users due to movement; and in a case that the second candidate list before updating is completely different from the second candidate list after updating, it is determined that the second mobile base station cannot replace the first mobile base station to provide service for the current users due to movement. In this case, a neighbor node different from the second mobile base station may be determined from among the first candidate list before updating as the successive base station, or a neighbor node from among the second candidate list before updating may be determined as the successive base station. Alternatively, the mobile base stations may be scheduled to a region where the first mobile base station is previously located, and the successive base station is determined from among the scheduled mobile base stations.

In another example, the scheduling manner may be determined in response to an indication that the first mobile base station cannot continue providing service for the current users. For example, the successive base station replacing the first mobile base station may be determined based on the first candidate list and/or the second candidate list. In the example, in step S14, the second candidate list may be updated every a predetermined time interval, or the first candidate list and the second candidate list may be updated every a predetermined time interval.

For example, in a case that the second mobile base station can replace the first mobile base station to provide service for the current users, the second mobile base station is determined as the successive base station. It can be determined that the second mobile base station can replace the first mobile base station to provide service for the current users, at least based on a fact that the second candidate list is at least partially the same as the second candidate list before updating.

In a case that the second mobile base station cannot replace the first mobile base station to provide service for the current users, a neighbor node different from the second mobile base station may be determined from among the first candidate list as the successive base station, or a neighbor node from among the second candidate list before updating may be determined as the successive base station. If the first candidate list is also updated in step S14, a neighbor node different from the second mobile base station may be determined from among the first candidate list before updating as the successive base station. Alternatively, the mobile base stations may be scheduled to a region where the first mobile base station is previously located, and the successive base station is determined from among the scheduled mobile base stations.

In addition, the first candidate list and the second candidate list each may include geographical location information of respective neighbor nodes, and the successive base station may be determined at least based on the geographical location information.

It should be noted that, the above methods can be performed separately or in combination with each other, and the details thereof are described in the first embodiment, which are not repeatedly described herein.

The technology of the present disclosure is applicable to various products. An example in which the electronic apparatus 100 according to the present disclosure is applied to a base station is described hereinafter. It should be understood that, the application example is only illustrative rather than restrictive. For example, the base station may be realized as any type of evolved Node B (eNB) such as a macro eNB and a small eNB. The small eNB such as a pico eNB, and a micro eNB may have a smaller coverage range than a macro cell. Alternatively, the base station may also be implemented as any other type of base stations, such as a NodeB and a base transceiver station (BTS). The base station may include a body (also referred to as a base station device) configured to control wireless communications; and one or more remote radio heads (RRHs) arranged in a different position from the body. In addition, various types of user equipments may each operate as the base station by temporarily or semi-persistently executing a base station function.

APPLICATION EXAMPLES REGARDING A BASE STATION

First Application Example

Figure 7:
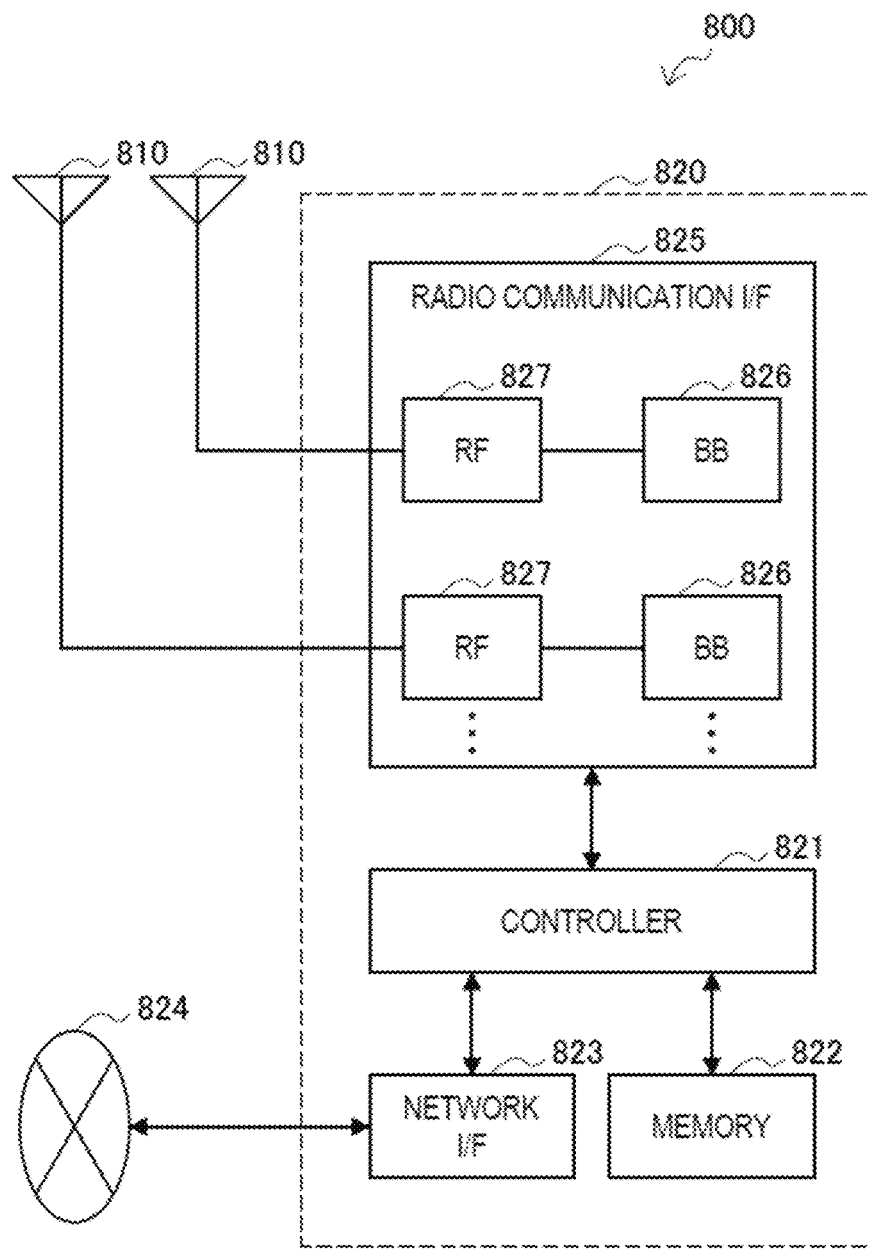
FIG. 7 is a block diagram illustrating a first example of a schematic configuration of an eNB to which the technology of the present disclosure may be applied.

FIG. 7 is a block diagram illustrating a first example of a schematic configuration of an eNB to which the technology of the present disclosure may be applied. An eNB 800 includes one or more antennas 810 and a base station apparatus 820. The base station apparatus 820 and each of the antennas 810 may be connected to each other via a radio frequency (RF) cable. Each of the antennas 810 includes a single or multiple antenna elements (such as multiple antenna elements included in a multiple-input multiple-output (MIMO) antenna), and is used for the base station apparatus 820 to transmit and receive wireless signals. As shown in FIG. 7, the eNB 800 may include the multiple antennas 810. For example, the multiple antennas 810 may be compatible with multiple frequency bands used by the eNB 800. Although FIG. 7 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an Si interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As show in FIG. 7, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 7. For example, the multiple RF circuits 827 may be compatible with multiple antenna elements. Although FIG. 7 shows the example in which the radio communication interface 825 includes the multiple BB processors 826 and the multiple RF circuits 827, the radio communication interface 825 may also include a single BB processor 826 or a single RF circuit 827.

Second Application Example

Figure 8:
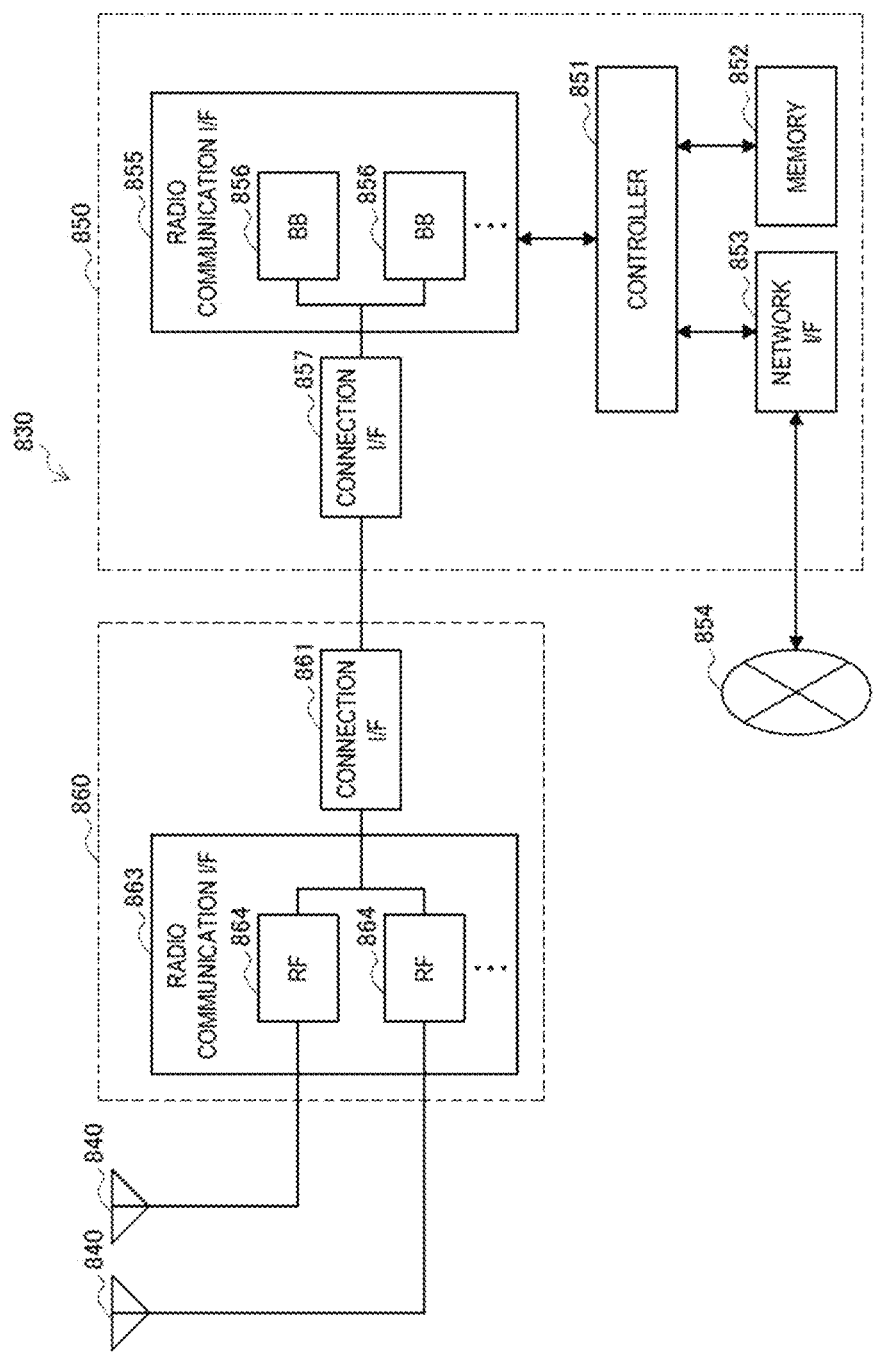
FIG. 8 is a block diagram illustrating a second example of a schematic configuration of an eNB to which the technology of the present disclosure may be applied.

FIG. 8 is a block diagram illustrating a second example of a schematic configuration of an eNB to which the technology of the present disclosure may be applied. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 8, the eNB 830 may include the multiple antennas 840. For example, the multiple antennas 840 may be compatible with multiple frequency bands used by the eNB 830. Although FIG. 8 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 7.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 7, except that the BB processor 856 is connected to an RF circuit 864 of the RRH 860 via the connection interface 857. As show in FIG. 8, the radio communication interface 855 may include the multiple BB processors 856. For example, the multiple BB processors 856 may be compatible with multiple frequency bands used by the eNB 830. Although FIG. 8 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 8. For example, the multiple RF circuits 864 may support multiple antenna elements. Although FIG. 8 shows the example in which the radio communication interface 863 includes the multiple RF circuits 864, the radio communication interface 863 may also include a single RF circuit 864.

In the eNB 800 and eNB 830 shown in FIG. 7 and FIG. 8, the transceiving unit described in the first embodiment may be implemented by the radio communication interface 825 and the radio communication interface 855 and/or the radio communication interface 863. At least a part of the functions may be implemented by the controller 821 and the controller 851. The first acquiring unit 101, the determining unit 102, the second acquiring unit 103 and the updating unit 104 described with reference to FIG. 2 and FIG. 3 may be implemented by the controller 821 and the controller 851. For example, the controller 821 and the controller 851 may acquire and update the first candidate list and the second candidate list and determine the scheduling manner of the mobile base station by performing functions of the first acquiring unit 101, the determining unit 102, the second acquiring unit 103 and the updating unit 104.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 900 shown in FIG. 9) from a storage medium or network, where the computer is capable of implementing various functions when installed with various programs.

Figure 9:
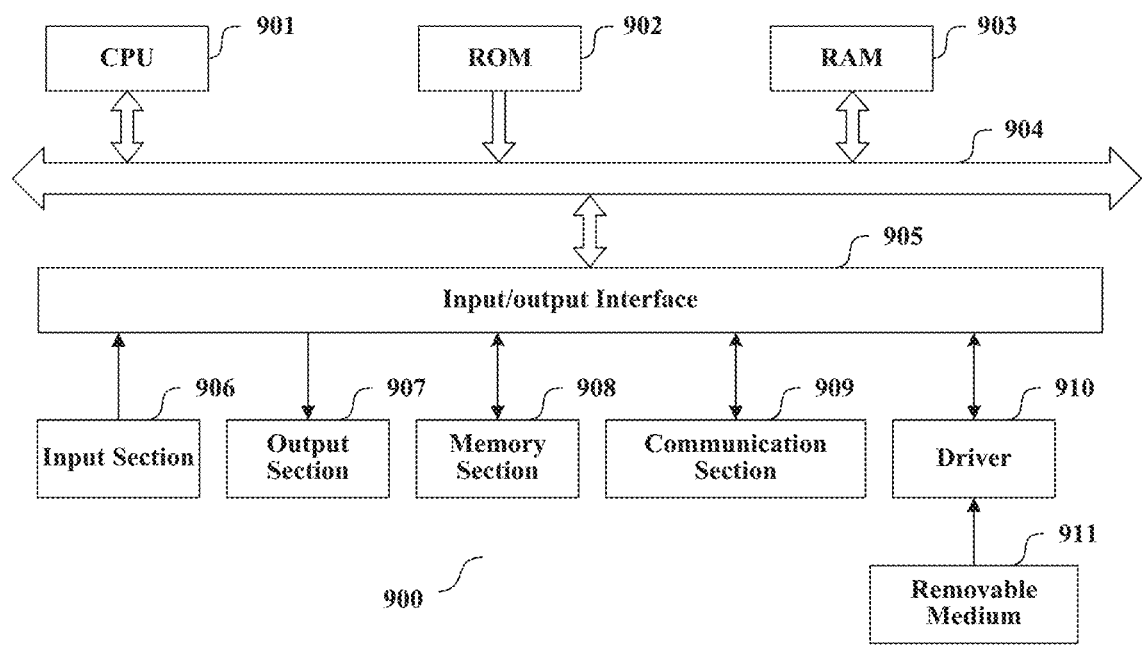
FIG. 9 is a block diagram of an exemplary block diagram illustrating the structure of a general purpose personal computer capable of realizing the method and/or device and/or system according to the embodiments of the present disclosure.

In FIG. 9, a central processing unit (CPU) 901 executes various processing according to a program stored in a read-only memory (ROM) 902 or a program loaded to a random access memory (RAM) 903 from a memory section 908. The data needed for the various processing of the CPU 901 may be stored in the RAM 903 as needed. The CPU 901, the ROM 902 and the RAM 903 are linked with each other via a bus 904. An input/output interface 905 is also linked to the bus 904.

The following components are linked to the input/output interface 905: an input section 906 (including keyboard, mouse and the like), an output section 907 (including displays such as a cathode ray tube (CRT), a liquid crystal display (LCD), a loudspeaker and the like), a memory section 908 (including hard disc and the like), and a communication section 909 (including a network interface card such as a LAN card, modem and the like). The communication section 909 performs communication processing via a network such as the Internet. A driver 910 may also be linked to the input/output interface 905, if needed. If needed, a removable medium 911, for example, a magnetic disc, an optical disc, a magnetic optical disc, a semiconductor memory and the like, may be installed in the driver 910, so that the computer program read therefrom is installed in the memory section 908 as appropriate.

In the case where the foregoing series of processing is achieved through software, programs forming the software are installed from a network such as the Internet or a memory medium such as the removable medium 911.

It should be appreciated by those skilled in the art that the memory medium is not limited to the removable medium 911 shown in FIG. 9, which has program stored therein and is distributed separately from the apparatus so as to provide the programs to users. The removable medium 911 may be, for example, a magnetic disc (including floppy disc (registered trademark)), a compact disc (including compact disc read-only memory (CD-ROM) and digital versatile disc (DVD)), a magneto optical disc (including mini disc (MD) (registered trademark)), and a semiconductor memory. Alternatively, the memory medium may be the hard discs included in ROM 902 and the memory section 908 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the essence and scope of the present disclosure. Therefore, the scope of the present disclosure is defined merely by the appended claims and their equivalents.

The invention claimed is:

1. An electronic apparatus for wireless communications, comprising:
processing circuitry, configured to:
acquire a first candidate list for a first mobile base station providing service to one or more users, the first candidate list comprising at least a part of neighbor nodes of the first mobile base station;
determine a neighbor node from among the first candidate list as a second mobile base station, which is capable of serving as a successive base station of the first mobile base station, to replace the first mobile base station to continue providing service for current users;
acquire a second candidate list for the second mobile base station, the second candidate list comprising at least a part of neighbor nodes of the second mobile base station;
update the first candidate list and the second candidate list;
compare the first candidate list before updating and the first candidate list after updating;
determine a first amount of overlap of neighbor nodes based on the comparison of the first candidate list before updating and the first candidate list after updating;
compare the second candidate list before updating and the second candidate list after updating;

determine a second amount of overlap of neighbor nodes based on the comparison of the second candidate list before updating and the second candidate list after updating; and maintain the second mobile base station as the successive base station when the second amount of overlap is greater than a second threshold;

determine as the successive base station, when the second amount of overlap is less than the second threshold, a neighbor node different from the second mobile base station from among the neighbor nodes included in the first candidate list and the second candidate list before updating;

continue the service with the first mobile base station when the first amount of overlap is greater than a first threshold; and switch service to the successive base station from the first mobile base station when the first amount of overlap is less than the first threshold.

2. The electronic apparatus according to claim 1, wherein the processing circuitry is configured to determine the neighbor node serving as the second mobile base station based on one or more of the following factors: quantity of electricity of the neighbor node, capability of the neighbor node, current service status of the neighbor node, and movement trace of the neighbor node.

3. The electronic apparatus according to claim 1, wherein the first candidate list and the second candidate list are created and provided by the first mobile base station and the second mobile base station via a broadcasting manner, respectively.

4. The electronic apparatus according to claim 1, wherein the processing circuitry is further configured to determine a scheduling manner of the mobile base station based on the first candidate list and/or the second candidate list.

5. The electronic apparatus according to claim 1, wherein the processing circuitry is further configured to update the second candidate list every predetermined time interval.

6. The electronic apparatus according to claim 5, wherein the processing circuitry is further configured to, in response to the first amount of overlap being less than the first threshold, determine the successive base station replacing the first mobile base station according to the first candidate list and/or the second candidate list.

7. The electronic apparatus according to claim 6, wherein the processing circuitry is configured to, in the case that the second mobile base station is capable of replacing the first mobile base station to provide service for the current users, determine the second mobile base station as the successive base station.

8. The electronic apparatus according to claim 7, wherein the processing circuitry is configured to determine, at least based on that the second candidate list is at least partially the same as the second candidate list before updating, that the second mobile base station is capable of replacing the first mobile base station to provide service for the current users.

9. The electronic apparatus according to claim 6, wherein the processing circuitry is configured to, in the case that the second mobile base station is not capable of replacing the first mobile base station to provide service for the current users, determine a neighbor node different from the second mobile base station from among the first candidate list as the successive base station, or determine a neighbor node from among the second candidate list before updating as the successive base station.

10. The electronic apparatus according to claim 6, wherein the first candidate list and the second candidate list each further comprises geographical location information of each neighbor node, and the processing circuitry is configured to determine the successive base station at least based on the geographical location information.

11. The electronic apparatus according to claim 5, wherein, the processing circuitry is further configured to update the first candidate list every predetermined time interval, and determine a scheduling manner by comparing the first candidate list before updating with the first candidate list after updating and by comparing the second candidate list before updating and with second candidate list after updating.

12. The electronic apparatus according to claim 11, wherein, the first amount of overlap is greater than the first threshold when the first candidate list before updating is at least partially the same as the first candidate list after updating, and wherein the processing circuitry is configured to determine that the second mobile base station is capable of replacing the first mobile base station to provide service for the current users when the second candidate list before updating is at least partially the same as the second candidate list after updating.

13. The electronic apparatus according to claim 11, wherein, the first amount of overlap is greater than the first threshold when the first candidate list before updating is at least partially the same as the first candidate list after updating, and wherein the processing circuitry is configured to determine that the second mobile base station is not capable of replacing the first mobile base station to provide service for the current users due to movement when the second candidate list before updating is completely different from the second candidate list after updating, and wherein, the processing circuitry is configured to determine a new second mobile base station from among the current first candidate list and acquire the second candidate list of the new second mobile base station.

14. The electronic apparatus according to claim 11, wherein, the first amount of overlap is less than the first threshold when the first candidate list before updating is completely different from the first candidate list after updating, and wherein the processing circuitry is configured to determine that the second mobile base station is capable of replacing the first mobile base station to provide service for the current users when the second candidate list before updating is at least partially the same as the second candidate list after updating, and wherein the processing circuitry is configured to determine the second mobile base station as the successive base station.

15. The electronic apparatus according to claim 11, wherein, the first amount of overlap is less than the first threshold when the first candidate list before updating is completely different from the first candidate list after updating, and wherein the processing circuitry is configured to determine that the second mobile base station is not capable of replacing the first mobile base station to provide service for the current users due to movement when the second candidate list before updating is completely different from the second candidate list after updating.

16. The electronic apparatus according to claim 15, wherein, the processing circuitry is configured to determine a neighbor node different from the second mobile base station from among the first candidate list before updating as the successive base station, or determine a neighbor node from among the second candidate list before updating as the successive base station.

17. The electronic apparatus according to claim 15, wherein, the processing circuitry is further configured to schedule mobile base stations to a region where the first mobile base station is previously located and determine the successive base station from among the scheduled mobile base stations.

18. The electronic apparatus according to claim 5, wherein, the processing circuitry is configured to adjust the predetermined time interval according to a frequency of emergency occurrence.

19. A method for wireless communications, comprising:
acquiring a first candidate list for a first mobile base station, the first candidate list comprising at least a part of neighbor nodes of the first mobile base station;
determining a neighbor node from among the first candidate list as a second mobile base station, which is capable of serving as a successive base station of the first mobile base station, to replace the first mobile base station to continue providing service for current users;
acquiring a second candidate list for the second mobile base station, the second candidate list comprising at least a part of neighbor nodes of the second mobile base station;
updating the first candidate list and the second candidate list;
comparing the first candidate list before updating and the first candidate list after updating;
determining a first amount of overlap of neighbor nodes based on the comparison of the first candidate list before updating and the first candidate list after updating;
comparing the second candidate list before updating and the second candidate list after updating;
determining a second amount of overlap of neighbor nodes based on the comparison of the second candidate list before updating and the second candidate list after updating; and
maintaining the second mobile base station as the successive base station when the second amount of overlap is greater than a second threshold;
determining as the successive base station, when the second amount of overlap is less than the second threshold, a neighbor node different from the second mobile base station from among the neighbor nodes included in the first candidate list and the second candidate list before updating;
continuing service with the first base station when the first amount of overlap is greater than a first threshold; and
switching service to the successive base station from the first mobile base station when the first amount of overlap is less than the first threshold.

\* \* \* \* \*